United States Patent
Rovera

(10) Patent No.: US 6,645,039 B2
(45) Date of Patent: Nov. 11, 2003

(54) HONEYCOMB-SHALLOW BOX PARTITION FOR BEEHIVES

(76) Inventor: Giuseppe Rovera, Via G. Macchi 85, Varese (IT)

( * ) Notice: Subject to any disclaimer, the term of this patent is extended or adjusted under 35 U.S.C. 154(b) by 0 days.

(21) Appl. No.: 10/264,335

(22) Filed: Oct. 3, 2002

(65) Prior Publication Data

US 2003/0068957 A1 Apr. 10, 2003

(51) Int. Cl.[7] .............................................. A01K 47/06
(52) U.S. Cl. ........................................ 449/21; 449/24
(58) Field of Search ............................ 449/20, 21, 23, 449/24, 25, 7

(56) References Cited

U.S. PATENT DOCUMENTS

| | | | | |
|---|---|---|---|---|
| 18,575 A | * | 12/1857 | McClellan | 449/7 |
| 870,274 A | * | 11/1907 | Caperton | 449/24 |
| 1,544,468 A | * | 6/1925 | McPhee | 449/24 |
| 3,704,471 A | * | 12/1972 | Bielby | 449/13 |

* cited by examiner

*Primary Examiner*—Robert P. Swiatek
(74) *Attorney, Agent, or Firm*—McGlew and Tuttle, P.C.

(57) ABSTRACT

A honeycomb-shallow box partition for beehives for honey production, characterized in that it consists of two upper and lower members (17, 18), respectively facing the honeycomb and the shallow box, and superimposable to form a frame (19, 23) serving as queen excluder, and a plurality of channels (21) for the unidirectional passage from the shallow box to the honeycomb and therefore serving as bee escape, one of the two members being capable of rotating relative to the other between an opening position of the frame and concurrent closing of the channels, and a closing position of the frame and concurrent opening of the channels.

9 Claims, 3 Drawing Sheets

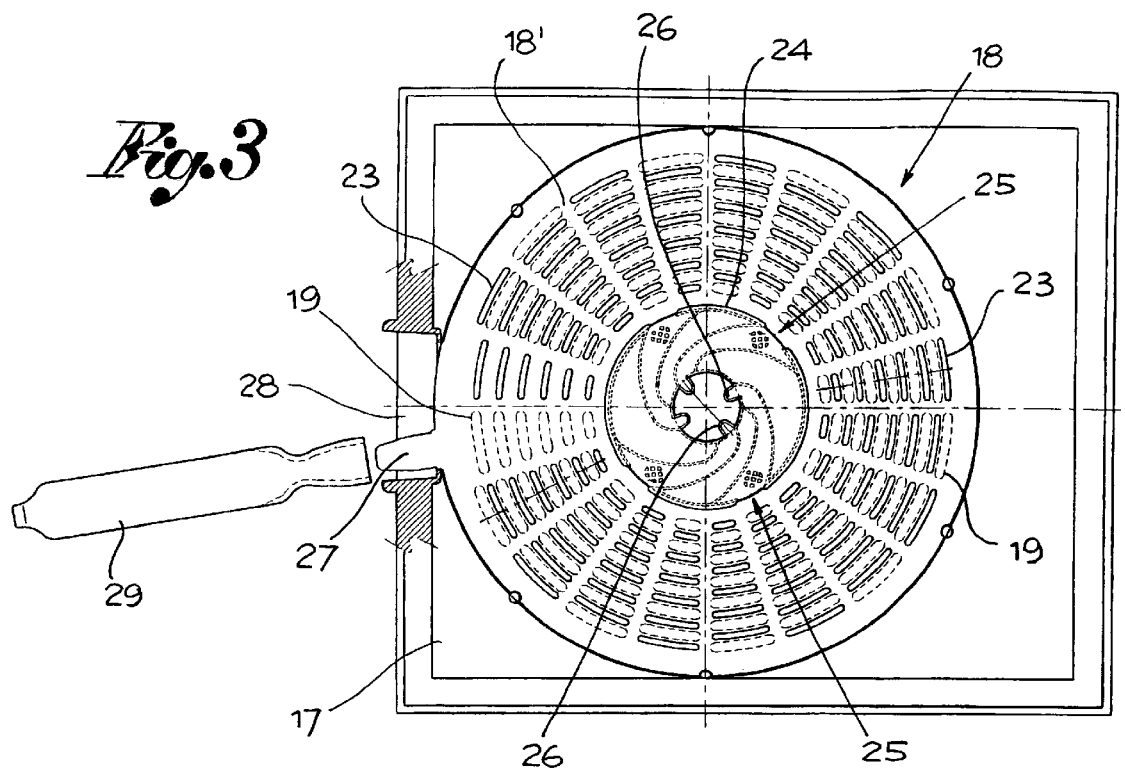
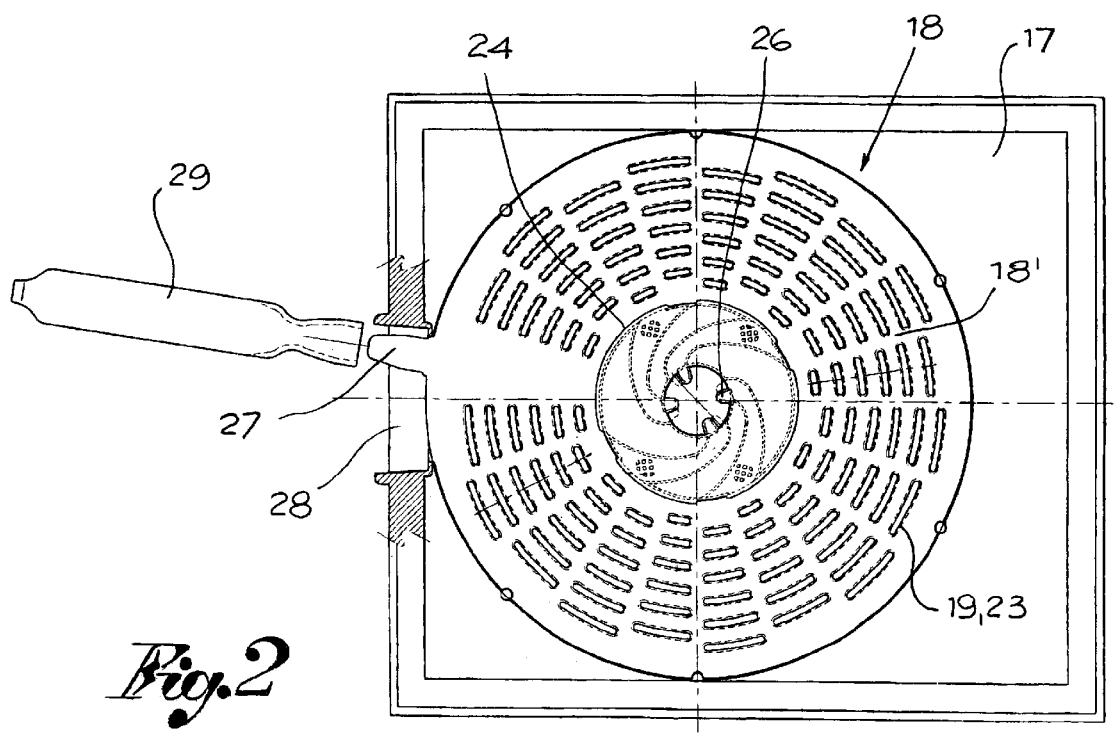

HONEYCOMB-SHALLOW BOX PARTITION FOR BEEHIVES

FIELD OF THE INVENTION

The present finding relates to the field of apiculture; in particular, it refers to a partition between the honeycomb and shallow box of beehives, having the function of queen excluder and bee escape.

BACKGROUND OF THE INVENTION

As well known to the operators in the field, in beehives for the production of honey the honeycomb and the upper store, called shallow box, are separated by a frame called an "excluder", whose meshes are suitably sized to allow the passage of worker bees from the honeycomb to the shallow box and vice versa, during the entire cycle of honey harvesting, and to prevent the entrance of the queen bee and of male bees into the shallow box, as they are larger than worker bees. This is to prevent breeding into the shallow box and to have an easier and quicker honey extraction and a cleaner honey, i.e., free from grubs. Upon honey extraction, however, the beekeeper must first make the worker bees still in the shallow box come out. To this purpose, he is usually forced to open the beehive the day before harvesting, removing the excluder for queens to replace it with a device called a bee escape, which consists of a series of channels suitably sized and configured to allow the passage of worker bees, usually in one direction, that is from the shallow box to the honeycomb. Since this is a very complex and difficult operation, many beekeepers prefer collecting the shallow box with the bees still inside the same, but they are thus compelled to disperse or kill them, thereby wasting working time.

SUMMARY OF THE INVENTION

An object of the present finding is to obviate the above disadvantage by proposing a honeycomb-shallow box partition for beehives which should be configurable to act both as a queen excluder frame during the normal production of honey by the worker bees, and as a bee escape when the shallow box must be collected for honey harvesting.

Another object of the finding is to provide a honeycomb-shallow box partition wherein switching between the operation as excluder and that as escape should be easily allowed by the actuation of a control lever, accessible from the outside of the beehive, without having the need of opening the beehive and disturbing the bees Such objects are achieved by a honeycomb-shallow box partition for beehives for honey production consisting of two upper and lower members, respectively facing the honeycomb and the shallow box, and superimposeable to form a frame serving as queen excluder, and a plurality of channels for the unidirectional passage from the shallow box to the honeycomb and therefore serving as a bee escape, one of said two members being capable of rotating relative to the other between an opening position of said frame and concurrent closing of said channels, and a closing position of said frame and concurrent opening of said channels.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a top view of the partition under discussion, configured to act as queen excluder;

FIG. 3 is a top view of the partition under discussion, configured to act as bee escape.

DESCRIPTION OF THE PREFERRED EMBODIMENT

Figure 1:
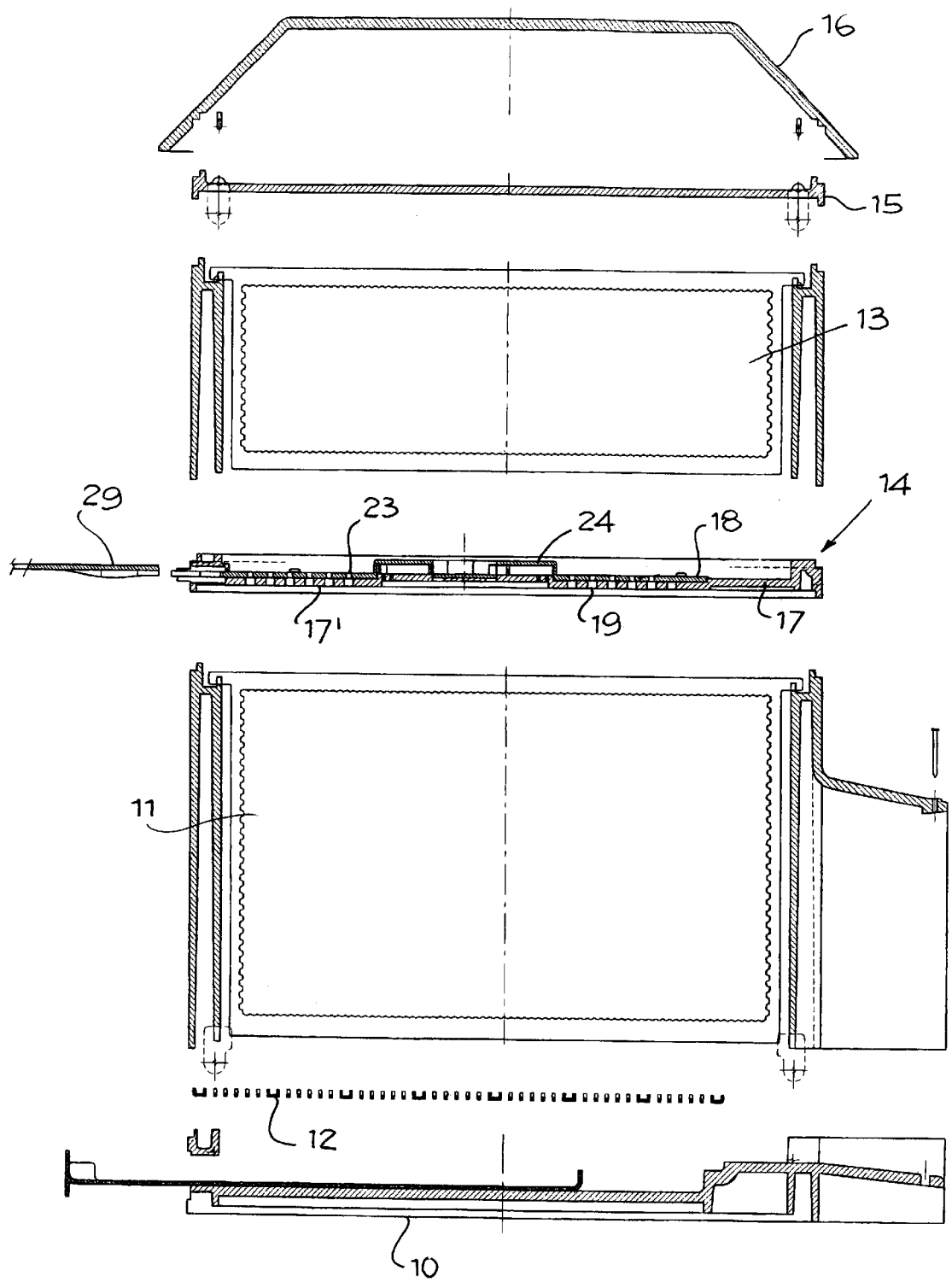
FIG. 1 is a longitudinal-section exploded view of the component parts of a beehive for honey production.

Referring to the drawings in particular, FIG. 1 shows a beehive for the production of honey substantially consisting of, in a known way, a base 10, a honeycomb 11 resting on base 10 with the interposition of a filter 12, a honey store or shallow box 13, arranged on top of and in communication with honeycomb 11 through a partition 14, a shallow box closing lid 15 and a roof 16.

According to the finding, partition 14 consists of two members reciprocally coupled: a base 17 facing honeycomb 11 and resting on its frame, and a disc 18 resting on said base and capable of rotating relative to it. More in detail, base 17 exhibits a central flat portion 17' shaped as a circular crown, wherein there are obtained radial rows of slots 19, the slots being aligned on concentric circumferences in alternate rows. The width of such slots, moreover, is selected to allow the passage of worker bees only, whereas the passage of queen and male bees is prevented.

Figure 4:
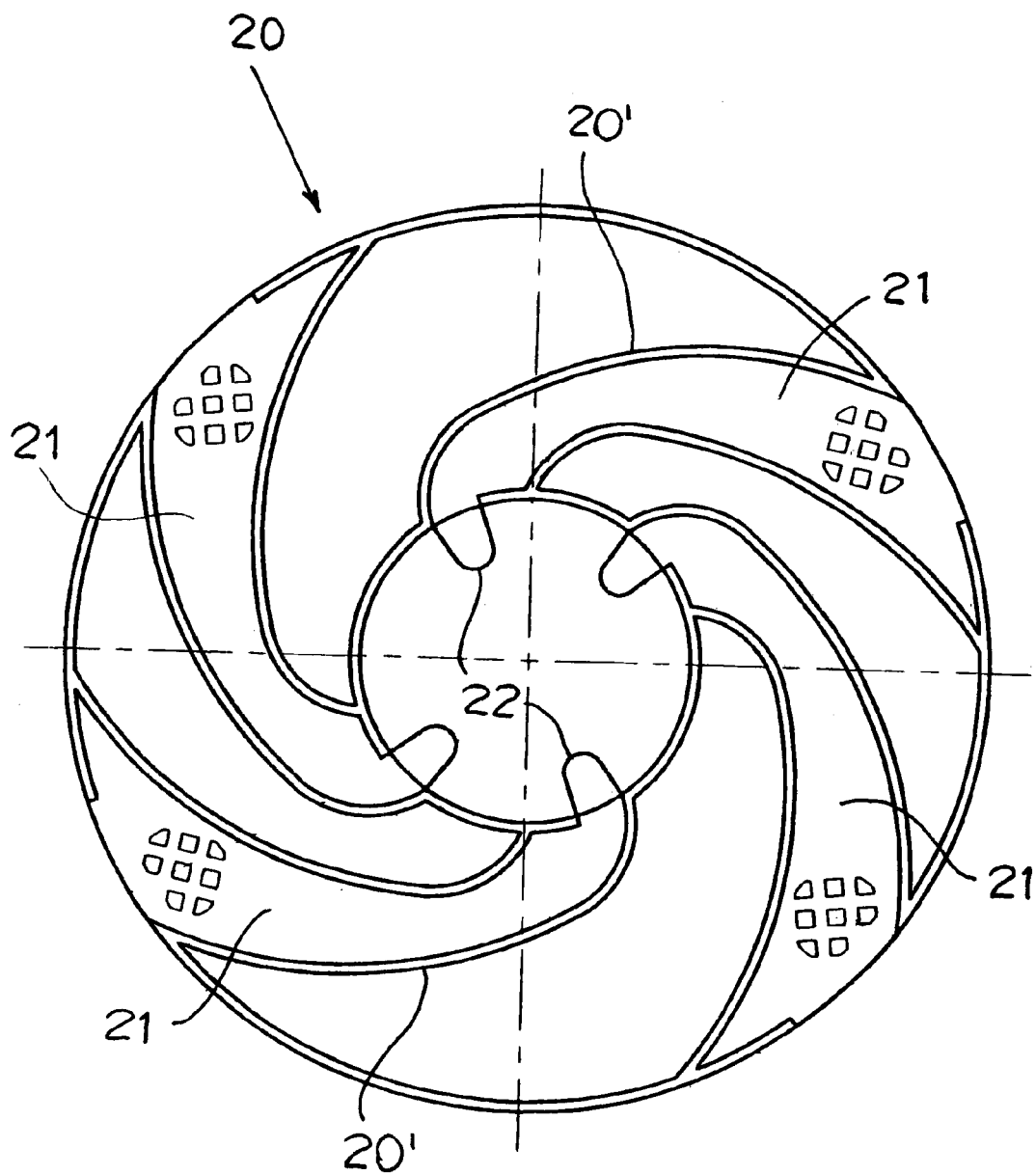
FIG. 4 is a top view of the unidirectional bee passage channels from the shallow box to the honeycomb.

In the middle of said crown of slots 19, base 17 exhibits a labyrinth structure 20, shown in FIG. 4, or a plurality of partitions or walls 20' defining some passage channels 21, four in the example shown, with a helical configuration, that starting from the innermost circumference of slots 19, merge towards the center, each opening towards a respective hole 22 obtained in base 17

Disc 18 exhibits a flat portion 18' intended to superimpose the corresponding portion 17' of the base and which also carries radial rows of slots 23 intended to be arranged in coincidence with slots 19 of the base, and a central raised covering 24, intended to close the top and side of the labyrinth structure 20. Such central covering 24 also exhibits side openings 25, one for each channel 21 of the base, and radial projections 26 facing the center and open in their lower side so as to be arranged corresponding to holes 22 of base 17.

Slots 23, side openings 25 and radial projections 26 of disc 18 are arranged so that when disc 18 is arranged relative to base 17 so that slots 23 and slots 19 of the two members are coincident, the passage channels 21 and holes 22 of the base are closed by the central portion 24 of the disc; on the other hand, when disc 18 is arranged so that slots 23 do not coincide with slots 19, the side openings 25 and the radial projections 26 of the central covering 24 are respectively in correspondence with the entrances of channels 21 and with holes 22 of base 17.

For its rotation relative to base 17, disc 18 exhibits a peripheral tooth 27 protruding from a side opening 28 of the base, said tooth being actuable by a control lever 29 as required.

In practice, the superimposition of the two crowns of slots 19 and 23 forms a frame acting as queen excluder, while the set of passage channels 21 and of the relevant covering 24 forms the bee escape, simulating the operation of a unidirectional valve. At the beginning of the honey production cycle, therefore, the partition under discussion is inserted between the honeycomb and the shallow box with the two crowns of slots 19 and 23 aligned to allow the passage of worker bees. In this position, the bee escape is closed. Before extracting the honey, the beekeeper will actuate the control lever 29 to turn disc 18 so as to close the queen excluder, i.e., slots 19 and slots 23 are placed out of alignment and the bee escape is automatically opened, thereby allowing the bees into the shallow box to return to the honeycomb through channels 21 and holes 22, without any possibility of going up again.

While specific embodiments of the invention have been shown and described in detail to illustrate the application of the principles of the invention, it will be understood that the invention may be embodied otherwise without departing from such principles.

What is claimed is:

1. A honeycomb-shallow box partition for beehives for honey production, comprising:

two lower and upper members, respectively facing the honeycomb and the shallow box, said members being superimposeable to form a frame, said frame serving as a queen bee excluder, and a plurality of unidirectional channels of said lower member serving as a bee escape for unidirectional passage from the shallow box to the honeycomb, one of said two members being capable of rotating relative to the other between an opening position of said frame and concurrent closing position of said channels, and a closing position of said frame and concurrent opening position of said channels.

2. A partition according to claim 1, wherein said lower member exhibits a plurality of slots arranged on concentric circumferential surfaces, a plurality of walls configured to delimit said unidirectional channels and a hole at one end of each of said channels.

3. A partition according to claim 2, wherein said channels have a helical configuration and extend from an innermost circumferential surface of said slots towards a center of said channels, said holes being obtained at an end of said unidirectional channels facing said center of said channels.

4. A partition according to claim 3, wherein said upper member is shaped as a disc having a flat peripheral portion crossed by a plurality of slots arrangeable at said slots of said lower member and a central raised portion closeable of sides and tops of said unidirectional channels.

5. A partition according to claim 4, wherein said slots of said two upper and lower members are sized to allow passage of worker bees only, and to prevent passage of said queen bee and said male bees.

6. A partition according to claim 5, wherein said central raised portion has, for each unidirectional channel, a side opening and a radial projection facing a center of said disc and open towards said lower member, said side openings being arrangeable at ends of said unidirectional channels facing said slots, said radial projections being superimposeable to said holes of said lower member.

7. A partition according to claim 6, wherein said slots of each said lower and said upper member are spaced from one another so that following rotation of one said member relative to the other said member, said slots of said upper member and those of said lower member are alternatively superimposeable to open said frame serving as a queen bee excluder, or spaceable, to close said frame.

8. A partition according to claim 7, wherein said slots, said side openings and said radial projections of said upper member are arranged so that when said slots of said upper member are aligned with said slots of said lower member, said unidirectional channels and said holes of said lower member are closed by said central raised portion of said upper member, and when said slots are spaced, said side openings and said radial projections of said raised central portion are respectively aligned with said unidirectional channels and relevant said holes of said lower member, to allow passage of said bees from the shallow box to the honeycomb.

9. A partition according to claim 1, wherein one of said two members is actuable in rotation relative to said other by a control lever protruding from the beehive.

\* \* \* \* \*